(12) United States Patent
Bruce

(10) Patent No.: US 8,147,003 B2
(45) Date of Patent: Apr. 3, 2012

(54) WHEEL ORNAMENTATION FOR USE WITH A VEHICLE WHEEL

(75) Inventor: Jeffrey D. Bruce, Milford, MI (US)

(73) Assignee: Big Rapids Products, Inc., Big Rapids, MI (US)

( * ) Notice: Subject to any disclaimer, the term of this patent is extended or adjusted under 35 U.S.C. 154(b) by 0 days.

(21) Appl. No.: 12/759,036

(22) Filed: Apr. 13, 2010

(65) Prior Publication Data

US 2010/0283312 A1 Nov. 11, 2010

Related U.S. Application Data

(60) Provisional application No. 61/176,722, filed on May 8, 2009.

(51) Int. Cl.
B60B 7/04 (2006.01)

(52) U.S. Cl. ............ 301/37.102; 301/37.106; 301/37.43

(58) Field of Classification Search ............ 301/37.101, 301/37.102, 37.24, 37.26, 37.27, 37.11, 37.372, 301/37.42, 37.43, 37.106
See application file for complete search history.

(56) References Cited

U.S. PATENT DOCUMENTS

| | | | |
|---|---|---|---|
| 2,306,630 A | 12/1942 | Lyon | |
| 3,517,968 A | 6/1970 | Tullly et al. | |
| 5,042,881 A | 8/1991 | Polka | |
| 5,096,263 A | 3/1992 | Wright | |
| 5,294,189 A | 3/1994 | Price et al. | |
| 5,358,313 A | 10/1994 | Polka | |
| 5,597,213 A | 1/1997 | Chase | |
| 5,630,654 A | 5/1997 | Chase | |
| 5,820,225 A * | 10/1998 | Ferriss et al. | ............ 301/37.371 |
| 5,845,973 A | 12/1998 | Chase | |
| 5,921,634 A | 7/1999 | Eikhoff | |
| 6,286,908 B1 | 9/2001 | Maloney et al. | |
| 6,406,100 B1 | 6/2002 | Kinstler | |
| 6,443,528 B1 | 9/2002 | Polka | |
| 6,554,371 B2 | 4/2003 | Maloney et al. | |
| 6,609,763 B1 | 8/2003 | Kinstler et al. | |
| 6,729,695 B2 | 5/2004 | Woelfel | |
| 6,779,852 B2 * | 8/2004 | Van Houten et al. | ...... 301/37.43 |

(Continued)

FOREIGN PATENT DOCUMENTS

JP 09-505542 6/1997

(Continued)

OTHER PUBLICATIONS

Written Opinion & International Search Report for PCT/US10/34002, Aug. 23, 2010, 7 pages.

*Primary Examiner* — Kip T Kotter

(74) *Attorney, Agent, or Firm* — Reising Ethington P.C.

(57) ABSTRACT

A wheel ornamentation that can fit vehicle wheels having different offset dimensions. According to one embodiment, the wheel ornamentation is a two-piece wheel cover that includes center and outer components and an adjustable overlapping junction therebetween, where the adjustable overlapping junction may be partially concealed by an annular flange on one of the components. An adhesive portion may be disposed between overlapping axial ends of the components and can be modified during assembly of the ornamentation to a vehicle wheel.

21 Claims, 4 Drawing Sheets

U.S. PATENT DOCUMENTS

| | | |
|---|---|---|
| 6,932,435 B2 | 8/2005 | Cutcher et al. |
| 6,991,299 B2 * | 1/2006 | Hauler .................. 301/37.43 |
| 6,998,001 B2 | 2/2006 | Woelfel |
| 7,025,426 B2 | 4/2006 | Hogan |
| 7,066,557 B2 | 6/2006 | Chase |
| 7,758,131 B1 * | 7/2010 | Wolf et al. ............. 301/37.43 |
| 2006/0261665 A1 * | 11/2006 | Gomora-Camargo et al. ............ 301/37.43 |

FOREIGN PATENT DOCUMENTS

| | | |
|---|---|---|
| JP | 09-509628 | 9/1997 |
| JP | 2001-502992 | 3/2001 |
| JP | 2002-362102 | 12/2002 |
| JP | 2004-224332 | 8/2004 |
| JP | 2005-506236 | 3/2005 |

* cited by examiner

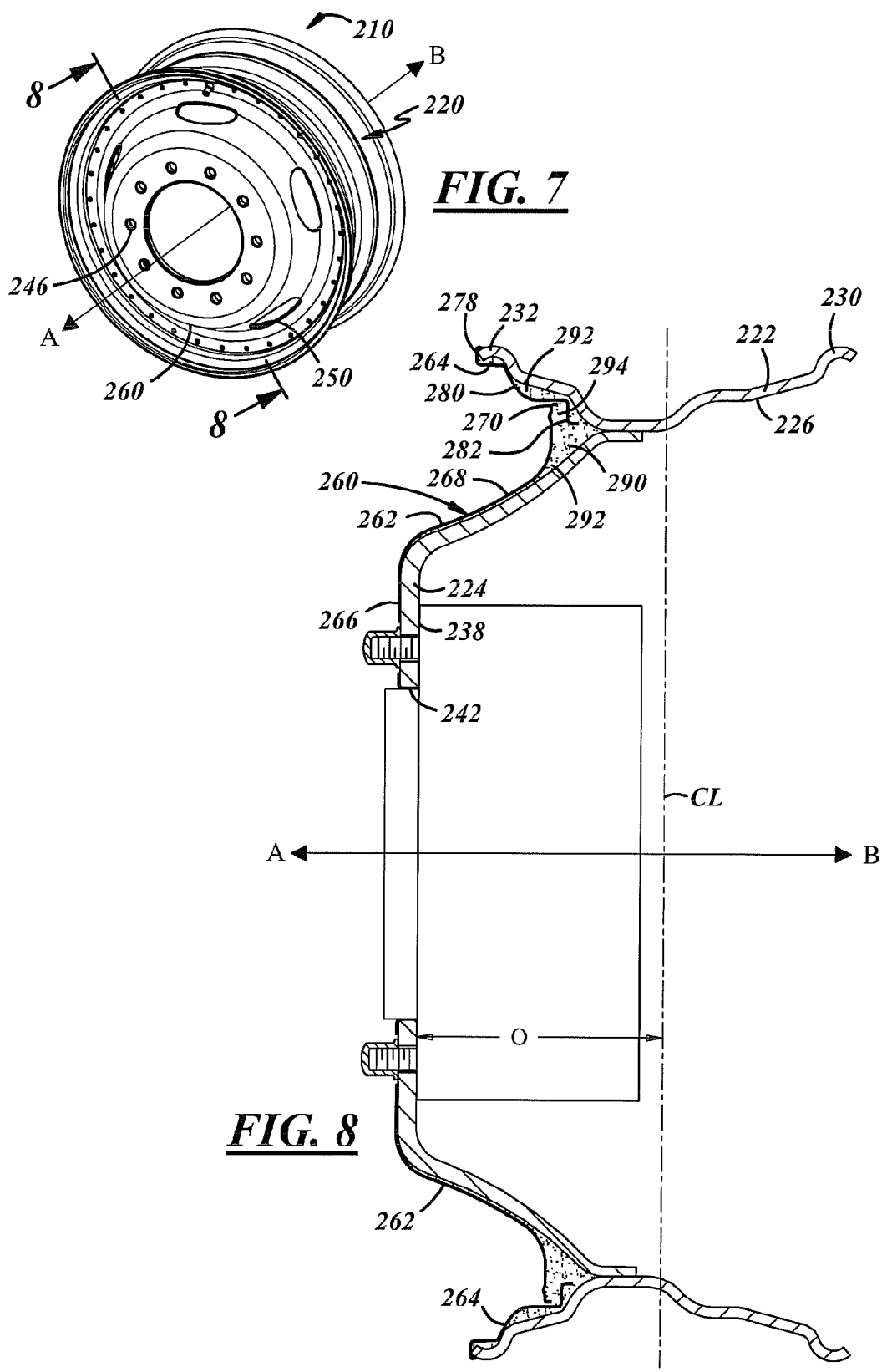

WHEEL ORNAMENTATION FOR USE WITH A VEHICLE WHEEL

REFERENCE TO RELATED APPLICATIONS

This application claims the benefit of U.S. Provisional Ser. No. 61/176,122 filed on May 8, 2009.

FIELD OF THE INVENTION

The present invention generally relates to wheel ornamentation for a vehicle.

BACKGROUND

Decorative wheel coverings are sometimes used with vehicle wheels to enhance their aesthetic appearance and can act as an alternative to directly applying decorative finishes to the structural wheel surface, such as paint, chrome plating, etc. Decorative wheel coverings can allow wheel and vehicle manufacturers to change the overall appearance of a vehicle wheel without redesigning and revalidating the underlying wheel. Some types of wheels are fabricated using manufacturing processes that inherently have more variation than others, and decorative wheel coverings sometimes have to accommodate such variations for a proper fit.

SUMMARY

According to one embodiment, there is provided a wheel ornamentation for use with a vehicle wheel, comprising: an outer component for covering a portion of the vehicle wheel; and a center component for covering a portion of the vehicle wheel and having an annular flange portion. The annular flange portion of the center component bends towards the outer component and at least partially conceals an adjustable overlapping junction between the center and outer components. The adjustable overlapping junction can be modified during assembly in order for the wheel ornamentation to accommodate vehicle wheels having different offset dimensions.

According to another embodiment, there is provided a wheel ornamentation for use with a vehicle wheel, comprising: a center component for covering a portion of the vehicle wheel and having an axial end, an outer component for covering a portion of the vehicle wheel and having an axial end, the axial ends of the center and outer components overlap each other; and an adhesive portion being disposed between the overlapping axial ends. The relative location of the center and outer components and the size of the adhesive portion can be modified during assembly in order for the wheel ornamentation to accommodate vehicle wheels having different offset dimensions.

According to another embodiment, there is provided a wheel ornamentation for use with a vehicle wheel having a disk and a rim, comprising: an outer component for covering a portion of the rim and having a flange portion; a center component for covering a portion of the disk and having an annular flange portion that overlaps the flange portion of the outer component and at least partially conceals an adjustable overlapping junction between the center and outer components; and an adhesive portion located between the center and outer components at the adjustable overlapping junction. The adjustable overlapping junction does not include physical contact between the center and outer components and the adjustable overlapping junction can be modified during assembly in order for the wheel ornamentation to accommodate vehicle wheels having different offset dimensions.

DESCRIPTION OF THE DRAWINGS

Objects, features and advantages of this invention will be apparent from the following detailed description of the preferred embodiments and best mode, the appended claims, and the accompanying drawings, in which:

FIG. 7 is an isometric view of an exemplary wheel assembly with a positive offset dimension; and FIG. 8 is a cross-sectional view of the exemplary wheel assembly of FIG. 7.

DESCRIPTION OF PREFERRED EMBODIMENTS

Figure 1:
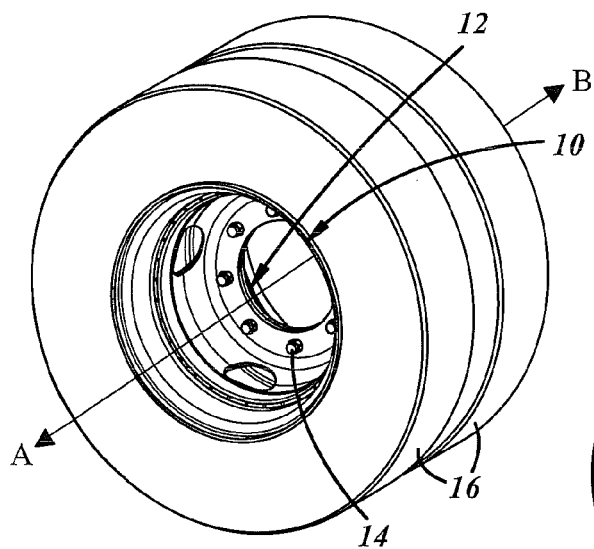
FIG. 1 is an isometric view of an exemplary wheel assembly shown in a dual-wheel configuration with tires mounted thereon.
Figure 2:
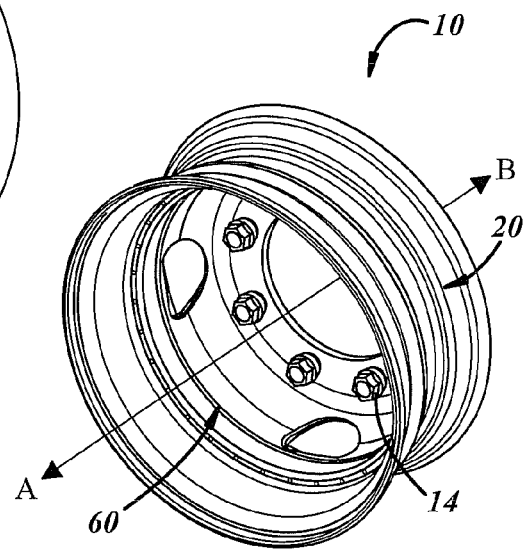
FIG. 2 is an isometric view of the exemplary wheel assembly of FIG. 1, but with the tires removed for purposes of illustration.
Figure 3:
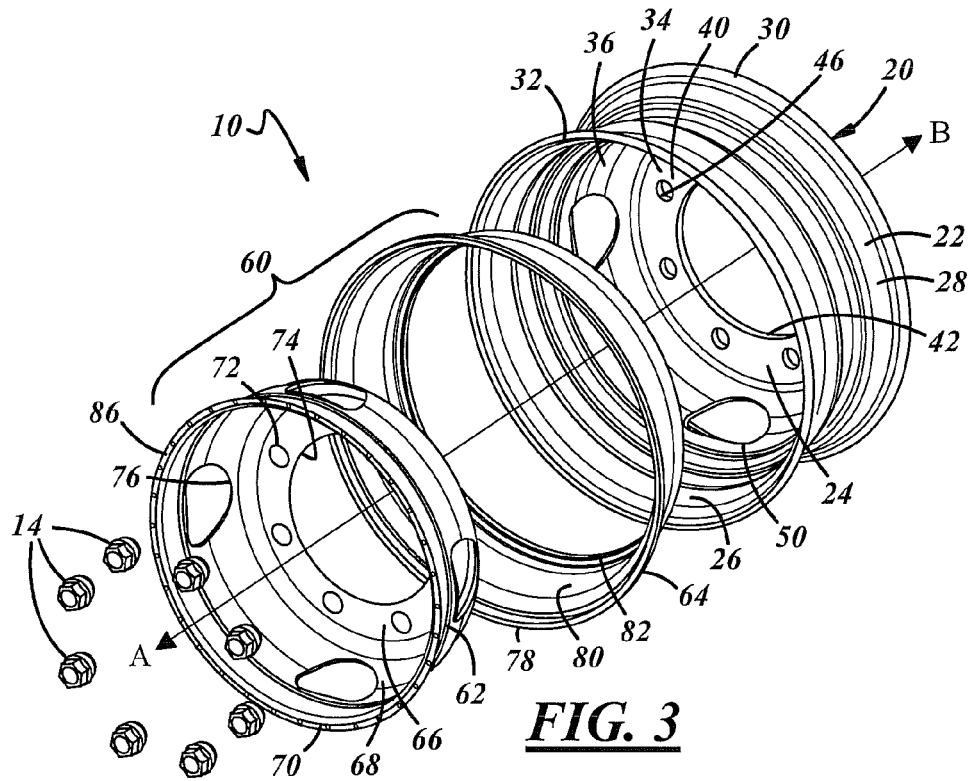
FIG. 3 is an isometric exploded view of the exemplary wheel assembly of FIG. 1.
Figure 4:
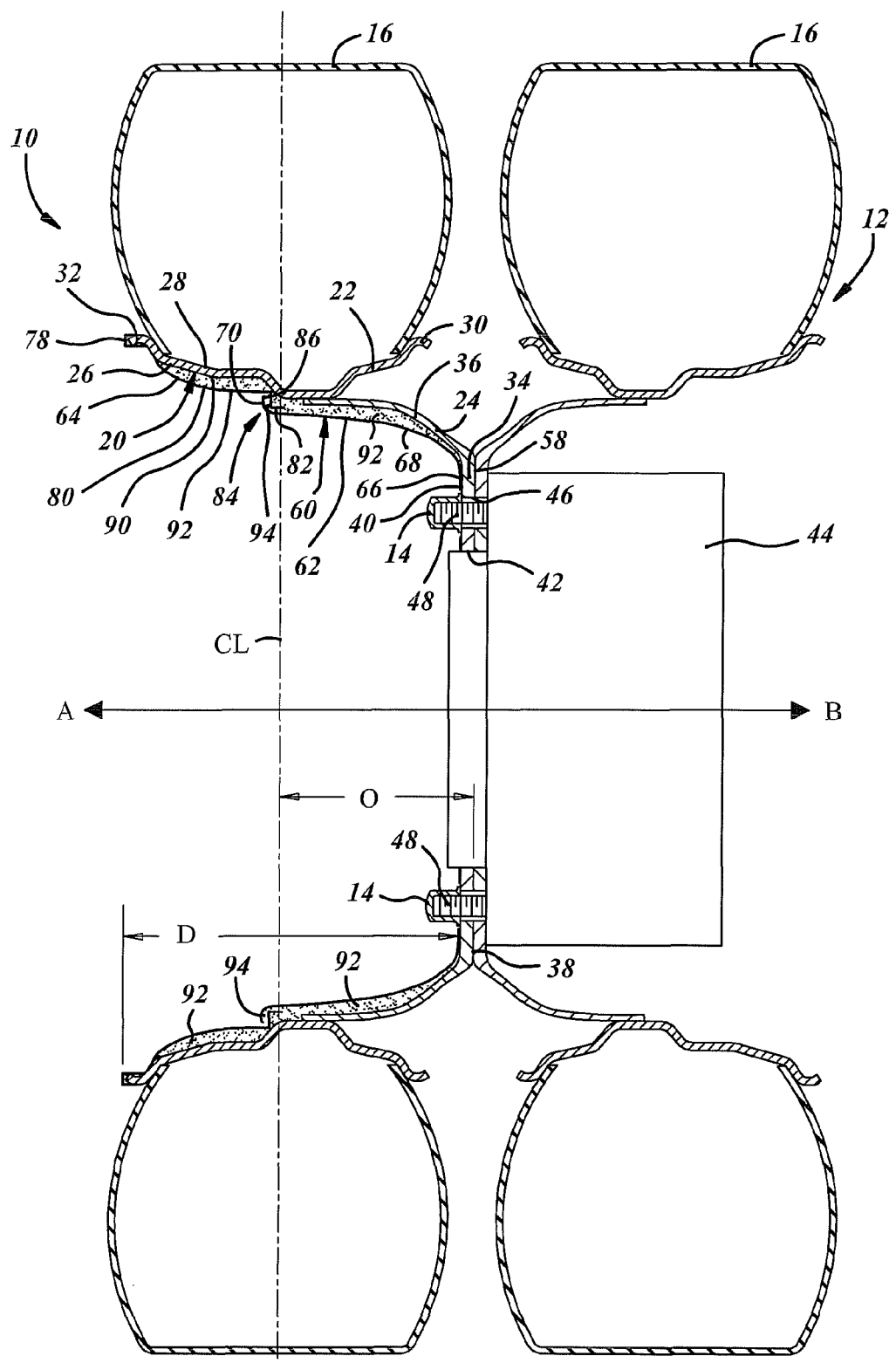
FIG. 4 is a cross-sectional view of the exemplary wheel assembly of FIG. 1, where the wheel assembly is mounted to a vehicle wheel hub.

Referring to FIGS. 1-4, there is shown an exemplary wheel assembly 10 for use with a vehicle, where the wheel assembly has a wheel ornamentation. The wheel ornamentation—or wheel cladding, covering or overlay as it is sometimes known—is generally provided for aesthetic purposes and covers or hides some of the interior components of the wheel assembly. According to an exemplary embodiment, the wheel ornamentation is a two-piece article that may be adjusted to accommodate vehicle wheels having a variety of different offset sizes, as will be explained. Thus, a single wheel ornamentation design, set of manufacturing tools, etc., may be used with a variety of vehicle wheel assemblies having different offset sizes. Although wheel assembly 10 is shown in FIGS. 1 and 4 having a dual-wheel configuration—i.e., a configuration with two coaxial wheels conventionally used on tractor-trailers and other vehicles designed to transport heavy loads—it should be appreciated that the wheel ornamentation described herein is not limited to this specific application. It is possible to the use the wheel ornamentation on a single-wheel configuration or some other type of arrangement known in the art.

In a dual-wheel configuration, a secondary wheel assembly 12 may be arranged adjacent and coaxial with wheel assembly 10 such that the two wheels are side-by-side. In this configuration, wheel assemblies 10, 12 can together be mounted to a vehicle using conventional lug nuts 14 that cooperate with lug studs 48 that extend from a vehicle wheel hub (see FIG. 4), or using other suitable attachment means. One or more inflatable tires 16 may be mounted on wheel assemblies 10, 12, as shown in the drawings. As used herein, the term "vehicle" broadly includes all forms of ground transportation that include wheels, no matter what their source of propulsion; this includes, but is certainly not limited to, tractor-trailers, commercial and non-commercial trucks, recreational vehicles (RVs), sports utility vehicles (SUVs), cars, etc., as well as any trailers or other wheeled objects that they may pull or to which they may otherwise be attached. According to the exemplary embodiment shown in FIGS. 1-4, wheel assembly 10 generally includes a wheel 20 and a two-piece wheel ornamentation 60 that nests or otherwise fits within the wheel. For purposes of the following description, an outboard direction A generally extends along the axis of wheel assembly 10 and away from the vehicle, while an inboard direction B generally extends along the axis of the wheel assembly and towards the vehicle.

Wheel 20 is mounted to a rotatable wheel hub 44 of the vehicle and carries inflatable tire 16 and wheel ornamentation 60. According to one embodiment, wheel 20 is made of a high strength material (e.g., steel, aluminum, magnesium or some other metal or metal alloy), and includes a rim 22 and a disk 24 that may be welded, bolted or otherwise secured to one another. In another embodiment, rim 22 and disk 24 are integrally joined to form a one-piece wheel structure such as that produced in a die-casting process. Rim 22 is a round or circular part that generally serves as the main structural component of wheel 20 and, in one embodiment, includes an inner surface 26, an outer surface 28, an inboard flange 30 and an outboard flange 32. Inner and outer surfaces 26, 28 are annular surfaces that oppose one another through the thickness of the rim and include a number of coaxial bands or annular sections that are adjacent one another and are designed to accommodate various parts of the wheel assembly (i.e., surfaces 26, 28 are not flat or smooth across their axial extent, but are contoured across these bands). For instance, inner surface 26 appears somewhat convex in cross-section and is contoured so that it may interact with different features of wheel ornamentation 60 (see FIG. 4). Conversely, outer surface 28 is somewhat concave in cross-section so that it forms a pocket that works with tire 16 to create an air-tight annular chamber or volume surrounding rim 22. Both the inner and outer surfaces 26, 28 extend in a generally axial direction from the inboard flange 30 to the outboard flange 32 across the width of rim 22. Skilled artisans will appreciate that flanges 30 and 32 may aid in retaining tire 16 on wheel 20, and may also provide attachment locations for wheel ornamentation 60, balance weights or some other component.

Disk 24 is securely attached to the inner surface 26 of the rim and facilitates mounting wheel 20 to vehicle wheel hub 44. In one embodiment, disk 24 includes a mounting portion 34, web portion 36, mounting face 38, contact face 40, pilot bore 42, lug holes 46, and openings 50. Mounting portion 34 is an annular component that includes mounting and contact faces 38, 40, which are generally flat surfaces that oppose one another through the thickness of the mounting portion with mounting face 38 contacting wheel hub 44 of the vehicle or contacting a portion of secondary wheel assembly 12, as shown in FIG. 4. Pilot bore 42 is located in the center of disk 24 and lug holes 46 surround the pilot bore; these openings are formed through mounting portion 34 and can receive lug studs 48 extending from vehicle wheel hub 44, as indicated in FIG. 4. Web portion 36 extends from mounting portion 34 to the point where it is attached to rim 22, and includes various openings 50 for brake cooling, weight reduction, material savings, etc.

Figure 5A:
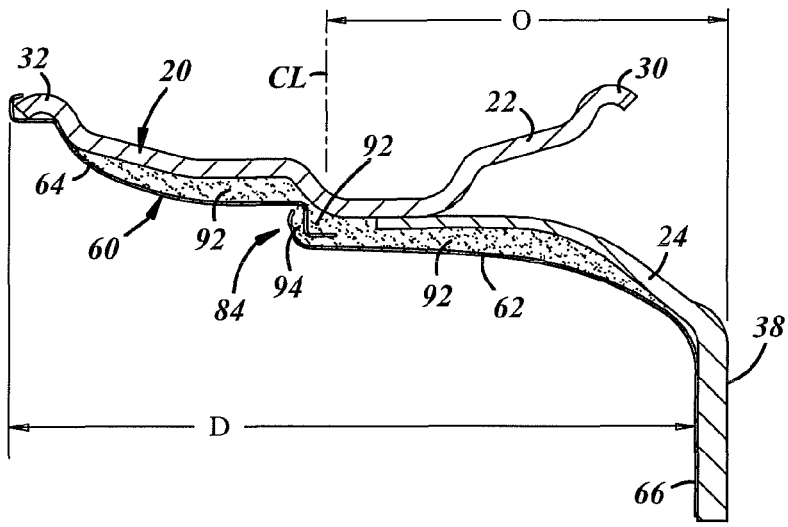
FIGS. 5A-B are partial cross-sectional views of the exemplary wheel assembly of FIG. 1, where the embodiment of FIG. 5A has a greater offset dimension O than the embodiment of FIG. 5B.
Figure 5B:
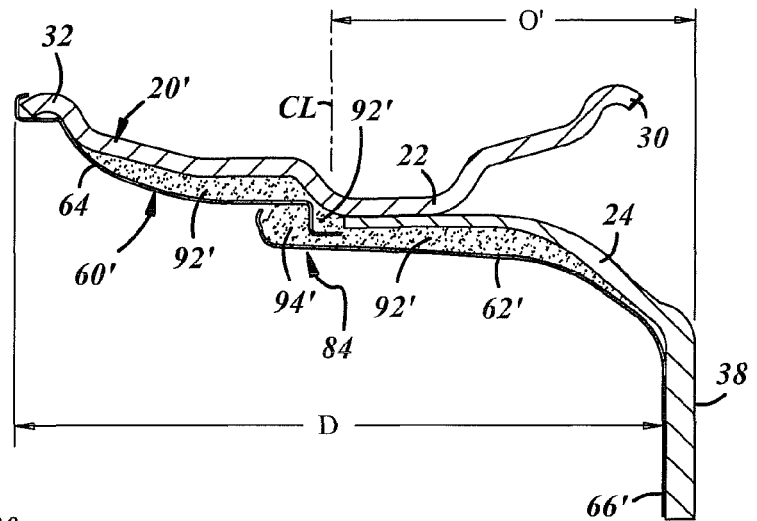

Together, rim 22 and disk 24 define an offset dimension O for wheel 20. As indicated in FIGS. 4-5B, offset dimension O is the axial distance from mounting face 38 to centerline CL of rim 22 (centerline CL may be determined as a line that is equidistant from outboard and inboard flanges 30, 32). Offset dimension O can vary for different vehicles depending on considerations such as brake and suspension packaging, vehicle load requirements, overall rim width, aesthetic styling, etc. Offset dimension O can also vary from wheel to wheel within a dimensional tolerance range for a particular wheel design due to variations in the manufacturing process. A typical passenger car or other light-duty vehicle is usually fitted with wheels having a 'positive offset dimension' (as shown in FIG. 8), where mounting face 38 lies on the outboard side of centerline CL, while a typical tractor-trailer or other heavy-duty vehicle is usually fitted with wheels having a 'negative offset dimension,' where mounting face 38 lies on the inboard side of centerline CL (a negative offset dimension is shown in FIG. 4). Some wheel ornamentations, such as those shown in FIGS. 1-4, are well suited for use with vehicle wheels having negative offset dimensions. Some wheels have an offset dimension O that is greater than one half of the overall width of the wheel; that is, mounting face 38 lies on the inboard side of inboard flange 30. This type of wheel construction can facilitate the dual-wheel configuration shown in FIGS. 1 and 4 where the secondary wheel assembly 12 is of the same construction as wheel 20, but attached to the vehicle in reverse axial orientation so that it has a positive offset dimension. Skilled artisans will recognize that as the overall width of wheel 20 increases (e.g., to accommodate wider tires), so too may the wheel offset dimension in order to facilitate the dual-wheel configuration shown in the figures. Additionally, while wheel ornamentation 60 is illustrated in the figures applied to typical drop-center type wheels having relatively large offset dimensions, it is suitable for use with other types of wheels including full-face, bead-seat attached, cast or forged one-piece wheels, or any other type of wheel having any offset dimension.

Wheel ornamentation 60 is a decorative article that can be adjusted during assembly in order to accommodate wheels having different offset dimensions. Wheel ornamentation 60 may be constructed from a variety of materials, including different types of metals and metal alloys (e.g., 301, 304 stainless steel), plastic materials (e.g., polycarbonate-ABS) or other materials selected on the basis of cost, manufacturability, weight, ease of decoration, durability, etc. In one preferred embodiment, wheel ornamentation 60 can be plated with decorative metals such as nickel-chrome plating or copper-nickel-chrome plating. Other forms of decoration may be utilized (e.g., metal polishing, paint, graphic films, mold-in-color resin, etc.) to achieve the desired aesthetic appearance. Wheel ornamentation 60, and in some embodiments its various components, may be constructed using various metal forming, injection molding or other known techniques. According to an exemplary embodiment, wheel ornamentation 60 is a thin, two-piece article that includes a center component 62, an outer component 64, and is attached to the wheel with an adhesive layer 90.

Center component 62 covers at least a portion of disk 24, and in one embodiment includes a contact portion 66, web portion 68, and an annular flange portion 70. Contact portion 66 is sized and shaped to mate with disk 24 so that an inboard surface of the contact portion makes contact with an outboard surface of the disk, namely contact face 40. Contact portion 66 can also include one or more lug holes 72 that line up with lug holes 46 formed in wheel 20, and a center hole 74 that lines up with pilot bore 42. In one embodiment, lug holes 72 are larger in diameter than their counterparts in the disk, lug holes 46. This way, when lug nuts 14 are tightened down, the underside of the nut can directly contact mounting portion 34 of the wheel for better torque and/or retention of wheel assembly 10 to vehicle wheel hub 44. Stated differently, lug nut 14 does not actually contact wheel ornamentation 60 but instead fastens directly to wheel 20 by way of the oversized lug holes 72. Likewise, center hole 74 may be larger in diameter than pilot bore 42 to allow tire mounting or other equipment to directly contact mounting portion 34 of wheel 20.

Web portion 68 extends both radially and axially away from contact portion 66 and generally follows the contours of web portion 36 of disk 24. According to an exemplary embodiment, web portion 68 includes one or more openings 76 that are shaped and sized to correspond with openings 50 in disk 24. As shown in the figures, openings 76 may generally be of the same shape, size, and number as openings 50 in order to allow air to circulate therethrough; however, they may have different shapes, sizes, numbers of holes, etc. depending on the overall aesthetic appearance of wheel assembly 10. Web portions 36, 68 may be complementary in design so that web portion 68 can nest or fit within web portion 36. FIG. 4 shows such an arrangement where an adhesive layer is located between web portions 36, 68 for purposes of affixing wheel ornamentation 60 to wheel 20, as will be subsequently explained in more detail. The contact portion 66 and annular flange portion 70 can be located on opposite ends of the center component such that the web portion 68 is located therebetween.

Annular flange portion 70 is located towards the outboard end of center component 62 and can be used to interact with and/or conceal a portion of adjustable overlapping junction 84. According to the particular embodiment shown here, annular flange portion 70 breaks away from web portion 68 in a radially outward direction and is large enough to cover a corresponding flange of the outer component 64 (best seen in FIG. 4). Annular flange portion 70 may be unbroken so that it circumferentially extends around outer component 64 in a continuous manner, or it may be broken or interrupted so that it circumferentially extends in a discontinuous manner, to cite a few possibilities. Although not necessary, it is preferable that annular flange portion 70 extend to an outboard position that is beyond at least a portion of outer component 64 so that an adjustable overlapping junction 84 is formed. As illustrated in FIG. 4, annular flange portion 70 may bend towards outer component 64 such that it at least partially conceals the adjustable overlapping junction 84 that exists between the center and outer components. Annular flange portion 70, which is located at an axial end of center component 62, may terminate in an annular edge 86 that opposes the outer component across a gap but does not physically contact the outer component. This non-contact type of arrangement may help reduce noise and vibrations in wheel 20, as acoustical and vibrational energy is not easily transmitted from the center component 62 to the outer component 64. In another embodiment the gap can be omitted, and the annular flange portion 70 can physically contact the outer component if desired for aesthetic or other reasons.

Outer component 64 covers at least a portion of rim 22, particularly the outboard portion of the rim, and in one embodiment includes a wrap-around portion 78, a contour portion 80, and a flange portion 82. Wrap-around portion 78 is a generally annular flange that is located towards the outboard end of outer component 64 and can be used to interact with and/or conceal a portion of outboard flange 32 of the rim. In the embodiment shown in FIG. 4, wrap-around portion 78 includes a first bend where it breaks away from contour portion 80 in an axial direction, and a second bend where the wrap-around portion extends in a radially outward direction. This arrangement enables wrap-around portion 78 to cover or hide the outboard flange 32 on rim 22. As with annular flange portion 70, wrap-around portion 78 may be continuous, discontinuous or provided according to some other embodiment. Skilled artisans will appreciate that in the exemplary embodiment shown in FIG. 4 where wrap-around portion 78 has a relatively small material thickness, standard balance weights can be applied to wheel assembly 10 over the wrap-around portion and can clip onto the outboard flange 32—i.e., wheel ornamentation 60 does not have to substantially affect balance weight fit-up compared to fit-up on an undecorated wheel. In another embodiment, wrap-around portion can be omitted or can be arranged so that outboard flange 32 remains visible.

Contour portion 80 lies between wrap-around portion 78 and flange portion 82, which are located on opposite ends of the outer component, and according to one embodiment generally follows the contour of the corresponding surface of rim 22. Although contour portion 80 is shown being a relatively smooth surface, it is possible for this or any other component of wheel ornamentation 60 to be ribbed, dimpled, or have some other type of surface feature or contour.

Flange portion 82 is a generally annular flange that is located towards the inboard end of outer ornamentation component 64 and can be used to interact with and/or conceal a portion of adjustable overlapping junction 84. In the exemplary embodiment illustrated here, flange portion 82 tucks underneath and is concealed by the annular flange portion 70 of center component 62. In order to fully conceal flange portion 82 from an outboard observer, annular flange portion 70 is somewhat wider than flange portion 82. This ensures that the flange portion of the outer component 64 can be fully hidden or covered by the flange portion of the center component 62. The adjustable overlapping junction 84, which involves the axial ends or flange portions 70 and 82 of the center and outer components, may be modified during assembly or manufacturing in order for the wheel ornamentation 60 to accommodate vehicle wheels having different offset dimensions. This feature is discussed more below. Of course, various features of both the center and outer ornamentation components 62, 64 may be added, deleted or changed from the exemplary embodiments shown here. For example, flange portions 70 and 82 could overlap one another in a reverse arrangement; that is, annular flange portion 70 tucks underneath of and is overlapped by flange portion 82. Wheel ornamentation 60 may also include various other components not shown in the embodiment depicted in the figures.

Adhesive layer 90 is used to attach or secure the center and outer components 62, 64 to wheel 20. Of course, non-adhesive approaches may alternatively be used for attaching the components of wheel ornamentation 60 to wheel 20; such approaches include mechanical attachments (e.g., press fits, friction fits, snap fits, fasteners, etc.), welding, soldering or any other suitable method. In embodiments where wheel ornamentation 60 is adhesively attached to wheel 20, such as those depicted in FIGS. 1-8, adhesive layer 90 may be disposed between and adhere to at least a portion of wheel 20 and wheel ornamentation 60. Adhesive layer 90 can fill voids created between the wheel and the wheel ornamentation, although complete void filling is not necessary. The adhesive layer 90 need only be sufficient to retain the wheel ornamentation 60 to the wheel 20, and may comprise one or more types of adhesive materials sufficient for a vehicle wheel environment. Some suitable materials for adhesive layer 90 include urethane-based adhesives, urethane-based foam adhesives, silicone-based adhesives, acrylic-based adhesives, epoxy-based adhesives, or other known materials, including various combinations thereof and foam versions of the same. In one embodiment, adhesive layer 90 includes a first set of adhesive portions 92 that adhere the wheel ornamentation to the wheel and a second set of adhesive portions 94 that generally adhere the wheel ornamentation components to one another.

Adhesive portions 92 include adhesive disposed directly between wheel ornamentation 60 and wheel 20, while adhesive portions 94 have adhesive disposed between different components of wheel ornamentation 60 (i.e., for inter-component bonding). As best seen in FIGS. 5A-B, adjustable overlapping junction 84 has a first adhesive portion 92 that separates outer component 64 from vehicle wheel 20 and retains the outer component to the wheel using adhesive forces. More specifically, it retains the contour portion 80 and/or the flange portion 82 of the outer component to the inner surface 26 of the rim. A second adhesive portion 94 separates the outer component 64 from center component 62 and is designed to take up the slack or overlap that can occur due to different offset dimensions O, as will be explained in more detail. According to this particular arrangement of the adjustable overlapping junction 84, outer component 64 is located closer to the vehicle wheel 20 than center component 62, and adhesive layer 90 is located between the center and outer components such that they do not physically contact each other at the adjustable overlapping junction. As wheel ornamentation 60 is adjusted to accommodate different offset dimensions O, the size or volume of adhesive portion 94 can change. The larger the offset dimension O, the less overlap between the center and outer components 62, 64 and hence the smaller the size or volume of adhesive portion 94 (FIG. 5A). In cases where the wheel assembly 10 has a smaller offset dimension O' (FIG. 5B), there is more overlap between the center and outer components 62', 64' and thus a larger adhesive portion 94'. In this way, wheel ornamentation 60 uses the overlapping flange portions 70, 82 and adhesive portion 94 to adjust for or accommodate differences in offset dimensions. Accordingly, a single wheel ornamentation design may be used with a number of different vehicle wheels, including ones with different offset dimensions.

Use of adhesive layer 90 as a means of attachment can additionally offer the advantage of reducing noise or audible vibration in the finished wheel assembly 10 while in use on a vehicle and subjected to dynamic loads. Adhesive layer 90 and its various portions can isolate the individual ornamentation components 62, 64 from portions of wheel 20 and/or from one another. This is particularly useful where metal-on-metal contact would otherwise result, such as between adjacent metal or metal-plated components or portions thereof. In particular, portions of adhesive layer 90, such as portion 94, can facilitate the attachment of the center and outer components to one another without the two components coming into physical contact with one another. Further, the material or materials used in adhesive layer 90 may be specifically selected for their sound damping properties.

Additionally, the use of adhesive layer 90 as a means of attachment can reduce some problems that may be caused by part-to-part tolerance variations. For example, the radial dimension or outer diameter of center component 62 nests within an inner diameter of outer component 64 in the exemplary embodiment shown, preferably with no contact between the two components. If the two components were to be mechanically attached to one another, smaller tolerances would be necessary in order to ensure a proper fit, whereas attachment via adhesive layer 90 reduces the importance of radial tolerances and provides for more dimensional variations.

Wheel ornamentation 60 may include some dimensions that correspond to dimensions of wheel 20 to which it is attached. For example, wheel ornamentation 60 has an axial dimension D, as shown in FIG. 4. Axial dimension D generally corresponds to the axial distance from the furthest outboard edge of wheel ornamentation 60 to contact portion 66 of the center component. Depending on the embodiment, axial dimension D could be less than the corresponding depth of the wheel such that a portion of the wheel is exposed or not concealed by wheel ornamentation 60, or such that the furthest inboard portion of the wheel ornamentation is spaced away from the wheel. The overall diameter of wheel ornamentation 60 may generally correspond to the overall diameter of wheel 20, however, it is possible for the diameter of the wheel ornamentation to be smaller than the diameter of the wheel so that only a portion of the wheel 20 is covered. In the embodiment shown in the figures, wheel ornamentation 60 covers substantially all of the otherwise visible surfaces of wheel 20 including mounting portion 34, web portion 36, inner surface 26 of rim 22, and at least a portion of outboard flange 30. In the embodiment shown in the figures, wheel ornamentation 60 is constructed from two components such that axial dimension D is a variable dimension; i.e., the relative positions of center and outer components 62, 64 are axially adjustable, with respect to one another. However, it is possible to construct wheel ornamentation 60 as a single component having an adjustable axial dimension D. For example, various types of collapsible or expandable one-piece structures are possible that can decrease or increase the axial dimension D, such as structures including living hinges, reversibly deformable portions, or other structures. Additionally, different embodiments of wheel ornamentation 60 are possible that include more than two components (e.g., three-piece or four-piece wheel ornamentation, etc.).

The adjustable nature of wheel ornamentation 60 is further illustrated in FIGS. 5A and 5B. FIG. 5A illustrates wheel ornamentation 60 attached to a wheel 20 having wheel offset dimension O, while FIG. 5B illustrates the same wheel ornamentation 60' attached to a different wheel 20' having a smaller offset dimension O'. Wheel 20' is constructed from substantially the same rim and disk as that of wheel 20, however, wheel 20' has a smaller offset dimension O' because the disk is attached to the rim at a position further outboard than it is for wheel 20. Center component 62, 62' remains generally in the same axial position relative to the disk on wheels 20 and 20', while outer component 64, 64' remains generally in the same axial position relative to the rim on wheels 20 and 20'. In this manner, the axial dimension D is adjustable and can fit wheels having different offset dimensions O. In an arrangement such as that illustrated, axial dimension D is continuously adjustable, meaning that it can be adjusted to an infinite number of overlap positions so that it exactly fits wheels with different offset dimensions and is not limited to a discrete number of overlap positions. Because axial dimension D can be adjusted during the manufacturing and assembly of wheel assembly 10, the accuracy of the adjustment can be increased by the utilization of automated manufacturing equipment when compared to manual installation of components that are designed to fit onto vehicle wheels that are already attached to vehicles. Skilled artisans will recognize that a wheel ornamentation 60 having an adjustable axial dimension D may have practical and economic advantages including, but not limited to, reduced tooling costs, part commonization, economies of scale, and other advantages.

Of course, other embodiments of wheel assembly 10 are possible. For example, wheel ornamentation 60 can be used with wheels that have a positive offset dimension such as secondary wheel assembly 12 shown in FIG. 4 or the embodiment illustrated in FIGS. 7 and 8. In an exemplary embodiment, wheel assembly 10 can be removed from FIG. 4 so that only wheel assembly 12 is attached to wheel hub 44. In this example, wheel ornamentation 60 can be adapted to generally cover the outboard surfaces of wheel assembly 12. As with previously described embodiments, center component 62 can cover at least a portion of disk 24, and outer component 64 can cover at least a portion of rim 22, particularly the outboard portions including the outboard flange. The two ornamentation components 62, 64 can likewise be constructed so that they are adjustable relative to one another to accommodate various positive offset dimensions. For example, ornamentation components 62, 64 can have an adjustable overlapping junction similar to that described in other embodiments. It is also possible for the overlapping arrangement of ornamentation components 62, 64 to be switched so that outer component 64 overlaps center component 62, instead of the center component overlapping or laying on top of the outer component, as shown in the drawings here.

Figure 6:
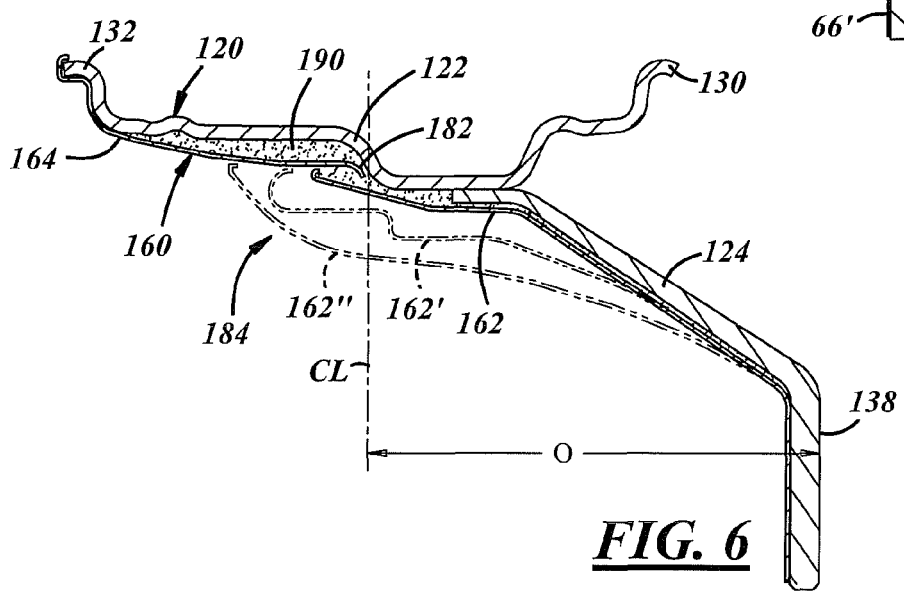
FIG. 6 is a partial cross-sectional view of another exemplary wheel assembly showing multiple wheel ornamentation embodiments.

Referring now to FIG. 6, a partial cross-section is shown of another exemplary wheel assembly. In this embodiment, wheel 120 is constructed from a rim 122 and a disk 124 and includes wheel ornamentation 160 covering various portions of its outboard or otherwise visible side. Wheel ornamentation 160 includes center component 162 and outer component 164 attached to wheel 120, and to one another, with various portions of adhesive layer 190. As with some previously described embodiments, center and outer components 162, 164 are constructed to be axially adjustable relative to one another during manufacture of the wheel assembly to accommodate various offset dimensions O. FIG. 6 illustrates various cross-sectional shapes or contours for the center component; these are indicated in phantom as center components 162' and 162". In embodiments like FIG. 6 where the center component overlaps or is on top of the outer component, these various shapes and contours for the center component are made possible. For example, center component 162 closely follows the contour of underlying wheel 120, while center ornamentation components 162' and 162" include shapes and contours that extend further away from wheel 120. If center component 162 were on the underside of outer component 164 at adjustable overlapping junction 184, for example, then this type of design freedom may not be available as such contours would interfere with the outer component which would be laying on top of the center component instead of beneath it. Any one of a number of different shapes of center ornamentation components can be used in combination with the same outer ornamentation component 164, thereby minimizing tooling and other costs normally associated with changing the aesthetic appearance of traditional wheel ornamentation. As is apparent in FIG. 6, each center component 162, 162', 162" can be constructed to provide axial adjustability relative to outer component 164, and can do so with great design flexibility.

The arrangement illustrated in FIG. 6, as well as those of FIGS. 1-5B, where an annular flange portion of the center component overlaps and conceals a flange portion of the outer component, can be advantageous when choosing aesthetic designs for the wheel assembly because the center portion of the wheel assembly is usually more visible than is the outer portion when it is mounted to a vehicle, making design flexibility of the center portion a desirable characteristic. Additionally, the flange portion of the outer component can sometimes be used to attach that component to plating, painting, or other types of finishing racks or jigs during manufacture. These types of racks or jigs can cause aesthetically undesirable marks such as scratch marks, plating burn marks, or unfinished areas at the rack attachment point. Using the arrangement described and shown in the figures allows the flange portion of the outer wheel component to be concealed from view after assembly.

FIG. 6 also illustrates one embodiment of flange portion 182 of outer component 164. Flange portion 182 is a relatively small-angled flange having a single bend in cross-section when compared to the embodiments including flange portion 82 in FIGS. 4-5B that include dual right angle bends. The smaller flange portion 182 is useful in embodiments of wheel ornamentation 60, 160 in which it is desired that the wheel ornamentation closely follow the contour of the underlying wheel. Of course, any number of shapes is possible for flange portion 82, 182, and in some cases it may be omitted altogether.

Referring now to FIGS. 7 and 8, a wheel assembly 210 is shown according to another embodiment and includes a wheel 220 and wheel ornamentation 260 attached thereto such that the wheel assembly can be mounted to a vehicle wheel hub in an orientation that defines a positive offset dimension O for the wheel assembly—i.e., rather than having a concave or dished shape when viewed from the outboard side, the wheel assembly has a generally convex shape protruding from it when viewed from the outboard side. Positive offset wheels such as this, particularly ones having an offset dimension O that is greater than one half of the width of the rim 222, may be commonly used with the front wheels of tractor-trailers, recreational vehicles, or other heavy-duty type vehicles. As with previous figures, the outboard direction is designated as "A" and the inboard direction is designated as "B" in FIGS. 7 and 8.

The illustrated positive offset embodiment includes many of the same features and advantages of the previously described negative offset embodiments. Wheel 220 is constructed from a rim 222, including an inboard flange 230 and an outboard flange 232, and a disk 224. The disk 224 is affixed to an inner surface 226 of the rim and extends in the outboard direction from the inner surface 226 and toward the radial center of the rim. Disk 224 can of course include various openings 250 and apertures such as pilot bore 242 and lug holes 246 for use in attachment to a vehicle wheel hub.

Exemplary wheel ornamentation 260 is a two-piece structure including center component 262 and outer component 264. Center component 262 is generally constructed to cover at least some portions of the disk 224 of the underlying wheel and includes contact portion 266, web portion 268, and annular flange portion 270. Outer component 264 is generally constructed to cover at least some portions of the rim 222 and may include wrap-around portion 278, contour portion 280, and flange portion 282. As shown, the annular flange portion 270 of the center component can overlap and conceal or hide the flange portion 282 of the outer component. As previously noted, this arrangement offers aesthetic design flexibility in the center component as opposed to an arrangement in which the outer component overlaps a portion of the center component, but either arrangement is possible. The center and outer components are axially adjustable relative to one another during manufacture to accommodate various offset dimensions O, which is measured from the center line CL of rim 222 to mounting surface 238.

As with previously described embodiments, wheel ornamentation 260 can be attached to wheel 220 with an adhesive layer 290 that includes first adhesive portions 292 disposed between portions of wheel ornamentation 260 and wheel 220, where the first adhesive portions may adhere and attach the various components of the wheel ornamentation to the wheel. A second adhesive portion 294 is disposed between the center and outer components and can adhere those components to one another. Adhesive layer 290 can also function as a vibration and noise inhibitor by isolating portions of wheel ornamentation 260 from wheel 220 and by isolating individual components of wheel ornamentation 260 from one another and from the wheel. In embodiments in which other attachment methods are used to secure wheel ornamentation 260 to wheel 220, adhesive layer 290 can be omitted in part or altogether, or non-adhesive materials may be used to isolate portions of the wheel assembly to reduce or prevent noise when the wheel is in use on a vehicle.

According to an exemplary assembly process, the outer component 64 is first adhered to the wheel 20 and then the center component is adhered to the wheel such that it slightly overlaps the outer component. Adhesive layer 90 can be disposed between wheel 20 and wheel ornamentation 60 in a variety of ways. For example, an adhesive material can be applied to wheel ornamentation 60 and/or wheel 20 while the wheel ornamentation and the wheel are separated from one another. The adhesive material can be applied using a variety of techniques including, but not limited to, application of one or more beads of adhesive through a nozzle or other type of dispensing device, spraying adhesive material onto the desired component(s), or other techniques. To control the location of adhesive deposition, numerically controlled equipment such as robotic equipment can be used and/or traditional masking techniques can be used. Wheel ornamentation 60 or its individual components can then be positioned on wheel 20 to wet out the adhesive material and form adhesive layer 90. In embodiments where a foam adhesive material is employed, the adhesive material can be formulated as a two-component adhesive having a delayed reaction time. The delayed reaction time can allow sufficient time to apply the foam adhesive material and allow sufficient time to bring the wheel and the wheel ornamentation together and align the two parts before the reaction begins and the foam adhesive layer begins to form and expand. In other embodiments, the adhesive material may be poured, injected, or otherwise inserted into any void formed between the wheel 20 and the wheel ornamentation 60 after the wheel and the wheel ornamentation are together in their desired relative positions. Disposing the adhesive material in this manner may necessitate pour or injection ports in the wheel 20 or the wheel ornamentation 60, for example.

In most cases, the adhesive layer will require a minimum cure time after application, depending on the type of adhesive material utilized. During the cure time, wheel 20 and the wheel ornamentation 60 may be held in a static position relative to one another. Various clamping techniques known in the art may be employed to apply clamping forces between the wheel 20 and the wheel ornamentation 60 to maintain the static positioning while the adhesive material cures. Alternatively, the mass of wheel 20 can be used to apply the clamping or bonding force. For example, wheel ornamentation 60 may be placed on a support fixture or jig that can maintain the wheel ornamentation 60 in an upside-down position where the inboard side of the wheel ornamentation 60 is facing upward. Adhesive material can then be applied to either the wheel ornamentation 60 or the wheel 20 or to both. Wheel 20 can then be placed on top of wheel ornamentation 60 with the outboard side of wheel 20 facing downward. In this orientation, the mass of wheel 20 can provide the necessary pressure between wheel 20 and wheel ornamentation 60 to maintain the static positioning while the adhesive cures and/or foams. This method may particularly be preferred where relatively heavy wheels are used in wheel assembly 10, such as wheels that are typically used on tractor-trailers or other heavy-duty vehicles.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A wheel ornamentation for use with a vehicle wheel, comprising:
   an outer component for covering a portion of the vehicle wheel; and
   a center component for covering a portion of the vehicle wheel and having an annular flange portion that bends in a generally radial direction towards the outer component and at least partially conceals an axially adjustable overlapping junction between the center and outer components;
   wherein the axially adjustable overlapping junction is configured so that the wheel ornamentation accommodates vehicle wheels having different axial offset dimensions.

2. The wheel ornamentation of claim 1, wherein the center component further comprises a contact portion having one or more lug holes and a web portion having one or more openings, the contact and annular flange portions are located on opposite ends of the center component such that the web portion is located therebetween.

3. The wheel ornamentation of claim 2, wherein the annular flange portion terminates in an annular edge that opposes the outer component across a gap but does not physically contact the outer component.

4. The wheel ornamentation of claim 1, wherein the outer component is generally annular in shape and further comprises a flange portion, a contour portion and a wrap-around portion for at least partially concealing a flange on the vehicle wheel, the flange and wrap-around portions are located on opposite ends of the outer component such that the contour portion is located therebetween.

5. The wheel ornamentation of claim 1, wherein the axially adjustable overlapping junction is arranged such that the outer component is located closer to the vehicle wheel than is the center component at the adjustable overlapping junction, and an adhesive layer is located between the outer and center components.

6. The wheel ornamentation of claim 5, wherein the outer component is separated from the vehicle wheel at the axially adjustable overlapping junction by a first adhesive portion and the center component is separated from the outer component at the axially adjustable overlapping junction by a second adhesive portion, wherein the vehicle wheel, the outer component and the center component do not physically contact each other at the axially adjustable overlapping junction.

7. The wheel ornamentation of claim 1, wherein the axially adjustable overlapping junction has an infinite number of overlap positions, as opposed to only having a finite number of overlap positions.

8. The wheel ornamentation of claim 1, wherein the outer component is located axially outboard of the center component.

9. The wheel ornamentation of claim 1, wherein the outer component is located axially inboard of the center component.

10. A vehicle wheel assembly, comprising:
    a disk and a rim that together define an axial offset dimension; and
    the wheel ornamentation of claim 1, wherein the center component of the wheel ornamentation covers a portion of the disk and the outer component of the wheel ornamentation covers a portion of the rim.

11. A wheel ornamentation for use with a vehicle wheel, comprising:
    a center component for covering a portion of the vehicle wheel and having an axial end;
    an outer component for covering a portion of the vehicle wheel and having an axial end, the axial ends of the center and outer components overlap each other; and
    an adhesive portion being disposed between the overlapping axial ends, wherein at least one of the center component or the outer component includes a generally radially extending portion in contact with the adhesive portion, and the relative location of the center and outer components and the size of the adhesive portion is configured so that the wheel ornamentation accommodates different vehicle wheels having different axial offset dimensions.

12. The wheel ornamentation of claim 11, wherein the center component further comprises a contact portion having one or more lug holes and a web portion having one or more openings, the contact portion and the axial end are located on opposite ends of the center component such that the web portion is located therebetween.

13. The wheel ornamentation of claim 12, wherein the axial end of the center component includes an annular flange portion that terminates in an annular edge that opposes the outer component across a gap but does not physically contact the outer component.

14. The wheel ornamentation of claim 11, wherein the outer component is generally annular in shape and further comprises a flange portion, a contour portion and a wrap-around portion for at least partially concealing a flange on the vehicle wheel, the flange and wrap-around portions are located on opposite ends of the outer component such that the contour portion is located therebetween.

15. The wheel ornamentation of claim 11, wherein the overlapping axial ends are arranged such that the axial end of the outer component is located closer to the vehicle wheel than the axial end of the center component, and the adhesive portion is located between the axial ends of the outer and center components.

16. The wheel ornamentation of claim 15, wherein the axial end of the outer component is separated from the vehicle wheel by a first adhesive portion and the axial end of the center component is separated from the axial end of the outer component by a second adhesive portion, wherein the vehicle wheel and the axial ends of the outer and center components do not physically contact each other.

17. The wheel ornamentation of claim 11, wherein the axial ends have an infinite number of overlap positions, as opposed to only having a finite number of overlap positions.

18. The wheel ornamentation of claim 11, wherein the outer component is located axially outboard of the center component.

19. The wheel ornamentation of claim 11, wherein the outer component is located axially inboard of the center component.

20. A vehicle wheel assembly, comprising:
    a disk and a rim that together define an axial offset dimension; and
    the wheel ornamentation of claim 11, wherein the center component of the wheel ornamentation covers a portion of the disk and the outer component of the wheel ornamentation covers a portion of the rim.

21. A wheel ornamentation for use with a vehicle wheel having a disk and a rim, comprising:
    an outer component for covering a portion of the rim and having a flange portion;
    a center component for covering a portion of the disk and having an annular flange portion that overlaps the flange portion of the outer component and at least partially conceals an axially adjustable overlapping junction between the center and outer components; and
    an adhesive portion located between the center and outer components at the axially adjustable overlapping junction, wherein the axially adjustable overlapping junction does not include physical contact between the center and outer components and the axially adjustable overlapping junction is configured so that the outer component is closer to the wheel than is the center component at the adjustable overlapping junction and so that the wheel ornamentation accommodates vehicle wheels having different axial offset dimensions.

* * * * *

UNITED STATES PATENT AND TRADEMARK OFFICE
CERTIFICATE OF CORRECTION

| | |
|---|---|
| PATENT NO. | : 8,147,003 B2 |
| APPLICATION NO. | : 12/759036 |
| DATED | : April 3, 2012 |
| INVENTOR(S) | : Bruce |

It is certified that error appears in the above-identified patent and that said Letters Patent is hereby corrected as shown below:

Col. 1, line 7: after "No." delete "61/176,122" and insert --61/176,722--

Signed and Sealed this
Fifteenth Day of May, 2012

David J. Kappos
*Director of the United States Patent and Trademark Office*